United States Patent
Li et al.

(10) Patent No.: US 9,331,563 B2
(45) Date of Patent: May 3, 2016

(54) ACTIVE SNUBBER TOPOLOGY

(71) Applicant: ABB Research Ltd, Zürich (CH)

(72) Inventors: Tin-Ho Li, Beijing (CN); Ngai-Man Ho, Fislisbach (CH); Gerardo Escobar, Merida (MX); Jonathan Bradshaw, Dietikon (CH)

(73) Assignee: ABB RESEARCH LTD, Zurich (CH)

( * ) Notice: Subject to any disclaimer, the term of this patent is extended or adjusted under 35 U.S.C. 154(b) by 219 days.

(21) Appl. No.: 14/242,288

(22) Filed: Apr. 1, 2014

(65) Prior Publication Data

US 2014/0313627 A1    Oct. 23, 2014

(30) Foreign Application Priority Data

Apr. 2, 2013 (EP) .................................. 13161957

(51) Int. Cl.
   *H02M 1/34* (2007.01)
(52) U.S. Cl.
   CPC .......... *H02M 1/34* (2013.01); *H02M 2001/342* (2013.01); *Y02B 70/1491* (2013.01)
(58) Field of Classification Search
   CPC ............ H02M 1/34; H02M 2001/342; H02M 2001/344; Y02B 70/1491
   USPC ........................................................ 361/91.5
   See application file for complete search history.

(56) References Cited

U.S. PATENT DOCUMENTS

| | | | | |
|---|---|---|---|---|
| 4,365,171 A | * | 12/1982 | Archer | H02M 1/34 327/478 |
| 4,805,079 A | * | 2/1989 | Van Buul | H02M 1/34 363/124 |
| 5,260,607 A | * | 11/1993 | Kinbara | H02M 1/34 327/427 |
| 5,313,382 A | | 5/1994 | Farrington | |
| 5,418,704 A | | 5/1995 | Hua et al. | |
| 5,708,575 A | * | 1/1998 | Marinus | H02M 1/44 363/21.12 |
| 5,943,200 A | * | 8/1999 | He | H02M 3/155 361/113 |
| 5,959,438 A | | 9/1999 | Jovanovic et al. | |
| 6,028,418 A | | 2/2000 | Jovanovic et al. | |
| 6,236,191 B1 | * | 5/2001 | Chaffai | H02M 1/34 323/222 |

(Continued)

FOREIGN PATENT DOCUMENTS

| | | |
|---|---|---|
| DE | 10 2004 022 136 A1 | 12/2004 |
| KR | 10 2004 0054088 A | 6/2004 |

OTHER PUBLICATIONS

European Search Report dated Sep. 26, 2013.

*Primary Examiner* — Scott Bauer
(74) *Attorney, Agent, or Firm* — Buchanan Ingersoll & Rooney PC

(57) ABSTRACT

Exemplary embodiments are directed to an snubber circuit and a power converter having an active circuit. The snubber circuit includes a series connection of a first diode and a first inductor connected between a first interfacing point and a first connection point, a second diode connected between a second connection point and a second interfacing point, a series connection of a third diode and a second inductor between a third interfacing point and the second connection point, a switching device connected between the first connection point and the third interfacing point, and a first capacitor connected between the first connection point and the second connection point. The first, the second, and the third diode are forward-biased along a path between the first interfacing point and the second interfacing point and through the third interfacing point.

20 Claims, 14 Drawing Sheets

(56) References Cited

U.S. PATENT DOCUMENTS

| | | | |
|---|---|---|---|
| 6,348,818 B1 * | 2/2002 | Filipovski | H02M 3/155 326/88 |
| 6,987,675 B2 | 1/2006 | Jovanovic et al. | |
| 2002/0047693 A1 | 4/2002 | Chang | |
| 2002/0079871 A1 | 6/2002 | Tanaka | |
| 2005/0226012 A1 | 10/2005 | Jovanovic et al. | |

* cited by examiner

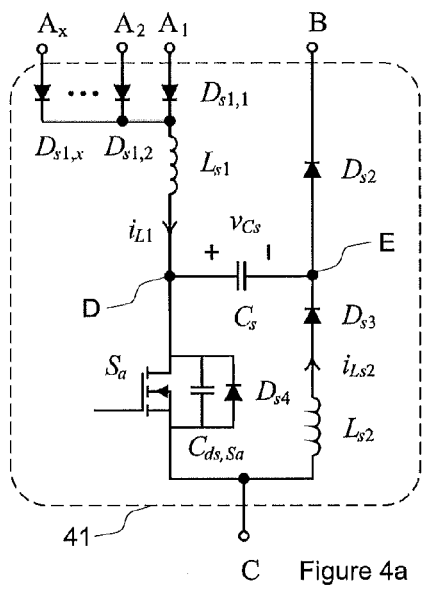
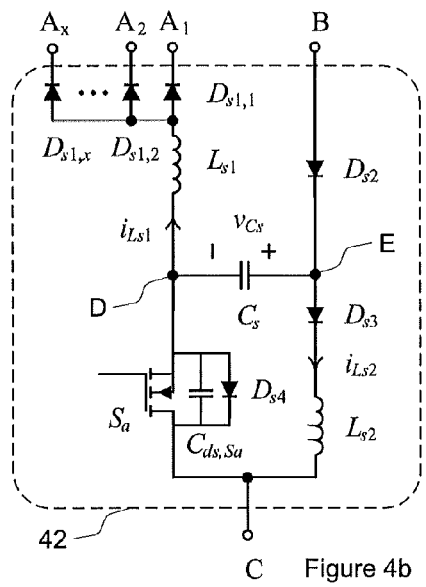
Figure 4a Figure 4b
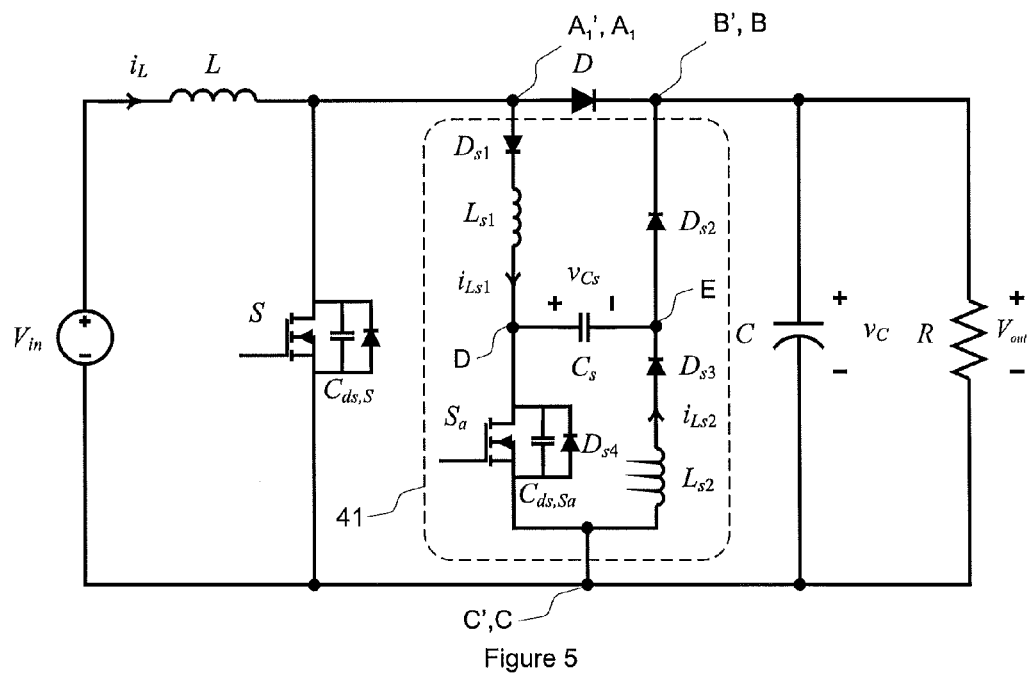
Figure 5

ACTIVE SNUBBER TOPOLOGY

RELATED APPLICATION

This application claims priority under 35 U.S.C. §119 to European Patent Application No. 13161957.9, filed in Europe on Apr. 2, 2013, the content of which is hereby incorporated by reference in its entirety.

FIELD

The present disclosure relates to power converters and particularly to snubber circuits for power converters.

BACKGROUND INFORMATION

The switching frequency of a main switching device in a power converter can be a key parameter which affects the electrical performance as well as the cost of the power converter. The size of passive elements, especially the magnetic elements, can be reduced by increasing the switching frequency of the converters. An input choke of a boost converter or an isolation transformer of a DC-DC converter can be used as examples of such magnetic elements. This reduction can have a direct and significant impact on the overall cost of the converter.

Known power converter applications having cost-efficiency as the main priority may greatly benefit from a possibility to increase the switching frequency. For example, in power converters for data centres or base stations of telecommunication applications, the switching frequency can be in the range of 200 kHz to 600 kHz. Such a range can offer a large potential for increasing the switching frequency, and, thus, also for reducing the size of the magnetic components. Reduction in the size of the magnetic component can, as mentioned, lead to significant cost savings and an increase in power density. Further, by increasing the switching frequency to a certain range, such as 20 kHz or above, low-cost and low-core-loss materials, such as soft ferrite, can be used for the magnetic elements of the power converters.

However, a large increase in the switching frequency of an existing power converter can include a trade-off. For example, an increase from a few kHz to tens of kHz can result in very high switching losses.

FIG. 1a shows an exemplary switching waveform of a known power converter, for example a 750-W boost converter with a 400-V output. In FIG. 1a, the voltage $V_{Cds,S}$ and the current $i_S$ of the switching device are shown. High current stresses 10 in the current $i_S$ are induced at turn-on at point 11 by reverse recovery current of the main diode and the high switching speed of the main switching device. FIG. 1a also shows high voltage stress 12 at turn-off at point 13, induced by high switching speed and the parasitic inductance of the circuit.

FIG. 1b shows corresponding switching trajectories of the known power boosted illustrated in FIG. 1a. The turn-on trajectory 14 and the turn-off trajectory 15, together with the current axis and the voltage axis, enclose areas which can correspond with switching losses in terms of energy dissipated in turn-on and turn-off actions of the main switching device. Thus, the switching losses increase linearly with the switching frequency.

Higher switching losses generate more heat, and a more powerful cooling system or a larger heat sink may be specified for extracting the heat efficiently and keeping the semiconductors from overheating. As a result, the power density and the power efficiency of the converter may degrade, and the cost savings gained in the magnetic parts may be nullified by the increased cooling system costs.

FIGS. 2a-2c illustrate quasi-resonant switches in accordance with known implementations. So called soft-switching can be used to achieve more better results, e.g., high switching frequency and low switching loss simultaneously. In order to change the switching of a converter from known hard-switching to soft-switching, at least two approaches may be used.

Soft-switching can be achieved by using a quasi-resonant switch, e.g., by replacing a known PWM switching cell, such as the one illustrated in FIG. 2a, by a quasi-resonant switching cell, such as the one illustrated in FIG. 2b or 2c. FIG. 2b shows a half-wave zero-current resonant switching cell whereas FIG. 2c shows a full-wave zero-current resonant switching cell.

A quasi-resonant switch can switch under zero-current turn-on and zero-voltage turn-off conditions. However, an additional resonant component and diode are connected in series with the main switch, which can increase the conducting state losses. Moreover, the main switch may suffer from either over-voltage or over-current stress. The stresses can be increased with the power rating of the converter. Compared with a hard-switching converter, a semiconductor switch with a higher rating may be specified. Higher rating, in turn, may increase the cost of the switch.

Another exemplary approach is to use an auxiliary circuit, a snubber, to assist the main switch to perform either zero-voltage or zero-current switching. A snubber can be defined as a circuit that is able to modify turn-on and/or turn-off switching trajectories of semiconductor switches and to reduce, or even eliminate, switching losses by processing a small amount of reactive power. FIG. 3 shows an exemplary block diagram of a snubber in a power converter according to a known implementation.

The rates of change di/dt and dv/dt in switching events can be lowered by resonant actions of the snubber. Oscillations induced by the switching actions and parasitic capacitors and inductors can also be reduced. As a result, EMI problems can be reduced.

Different snubber circuits have already been published in various scientific papers and patent publications. The proposals can be differentiated from each other mainly by achieving zero-voltage or zero-current switching and by the reset circuit of the snubber. U.S. Pat. No. 6,987,675B2, U.S. Pat. No. 6,028,418A, U.S. Pat. No. 5,313,382A, U.S. Pat. No. 6,236,191B1, U.S. Pat. No. 5,959,438A, U.S. Pat. No. 5,418,704A, US Patent Application US20020047693A1, and South Korean Patent Application KR20040054088A disclose some exemplary approaches for implementing snubber circuits.

SUMMARY

An exemplary snubber circuit is disclosed comprising: a first interfacing point, a second interfacing point, and a third interfacing point; a first connection point and a second connection point; a series connection of a first diode and a first inductor connected between the first interfacing point and the first connection point; a second diode connected between the second connection point and the second interfacing point; a series connection of a third diode and a second inductor connected between the third interfacing point and the second connection point; a switching device connected between the first connection point and the third interfacing point; and a first capacitor connected between the first connection point and the second connection point, wherein the first, the second, and the third diode are forward-biased in a first direction along a path between the first interfacing point and the second interfacing point and through the third interfacing point, and the switching device is configured to control a flow of current in the first direction.

DESCRIPTION OF THE DRAWINGS

In the following the invention will be described in greater detail by means of preferred embodiments with reference to the attached drawings, in which

FIGS. 4a and 4b illustrate two exemplary variants an active snubber topology in accordance with an exemplary embodiment of the present disclosure;

FIG. 5 illustrates an exemplary boost converter having an snubber circuit in accordance with an exemplary embodiment of the present disclosure;

DETAILED DESCRIPTION

Figure 1A:
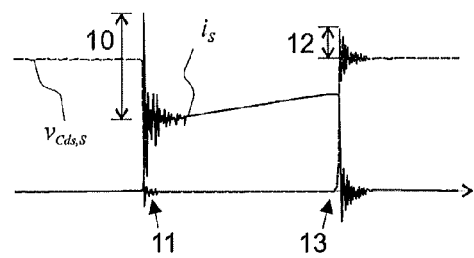
FIGS. 1a and 1b illustrate exemplary switching waveforms and switching trajectories of a known power converter.
Figure 1B:
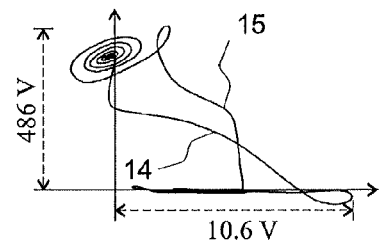
Figure 2A:
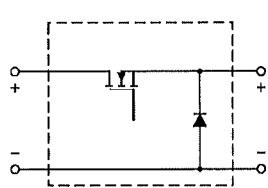
FIGS. 2a, 2b, and 2c illustrate a switching cell, a half-wave zero-current resonant switching cell, and a full-wave zero-current resonant switching cell, in accordance with known implementations, respectively.
Figure 2B:
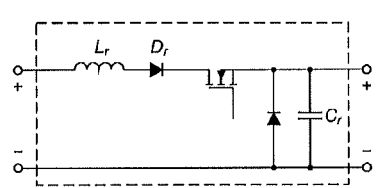
Figure 2C:
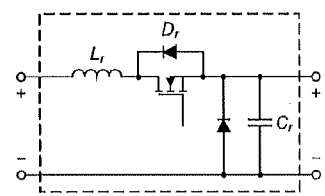
Figure 3:
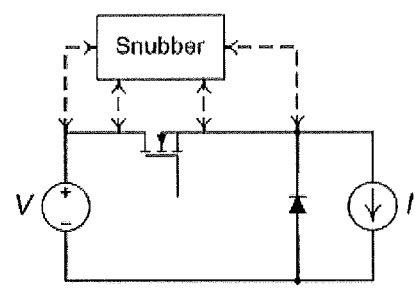
FIG. 3 illustrates an exemplary block diagram of a snubber in a power converter in accordance with a known implementation.

Exemplary embodiments of the present disclosure alleviate the disadvantages of known implementations by providing an active snubber topology which can reduce the switching losses of a main switch or main switches in a power converter. The active snubber includes an auxiliary switching device and modifies the switching trajectories of switching actions of the main switching device. The disclosed active snubber can assist the main switching device to perform turn-on and turn-off actions at zero-voltage. Switching losses can therefore be minimized.

The exemplary snubber described herein may be connected in parallel with the main switching device of the power converter. Thus, no series connection of a snubber inductor to the main switch or diode creating high conducting state losses is specified. The snubber topology of the present disclosure can have a very short operating time, for example less than 2 µs, which minimizes conducting state losses in the snubber circuit. The exemplary snubber of the present disclosure also has a very small effect on the RMS current of the main switch, which minimizes the increase in the conducting state losses of the main switch.

Since the switching losses of the main switch are reduced, the switching frequency of the converter can be increased without overheating the semiconductors. As a result of a higher switching frequency, the physical size, weight and cost of the magnetic components can be reduced without a reduction in the converter efficiency. Moreover, a higher switching frequency may also allow the use of low-cost magnetic materials, such as ferrite.

The exemplary snubber of the present disclosure implementation can be applied in different power stage topologies. For example, the exemplary snubber topology circuit disclosed herein can reduce the switching losses of single-phase or multi-phase, two-level or three-level non-isolated DC-DC converters.

FIGS. 4a and 4b illustrate two exemplary variants an active snubber topology in accordance with an exemplary embodiment of the present disclosure. FIGS. 4a and 4b show two exemplary variants 41 and 42 of implementations of the disclosed active snubber topology which can assist a main switch in a converter to turn on and off at zero-voltage. In FIGS. 4a and 4b, the topology of the two snubber implementations 41 and 42 is the same but the polarity is different. The implementation of the exemplary snubber topology of the present disclosure in a converter depends on the polarity of the voltage and current sources of the converter with respect to the main switching device of the converter.

In both FIGS. 4a and 4b, the active snubber circuit includes one or more first interfacing points $A_1$ to $A_x$, where x is the number of phases in the converter; a second interfacing point B, a third interfacing point C; a first connection point D; and a second connection point E.

The interfacing points $A_1$ to $A_x$ are connected to a common point through parallel first diodes $D_{s1,1}$ to $D_{s1,x}$, respectively. A first inductor $L_{s1}$ is connected between the common point and the first connection point D, thus forming paths, e.g., series connections of a first diode and the first inductor $L_{s1}$, between the first interfacing points $A_1$ to $A_x$ and the first connection point D. A second diode $D_{s2}$ is connected between the second connection point E and the second interfacing point B. A series connection of a third diode $D_{s3}$ and a second inductor $L_{s2}$ is connected between the third interfacing point C and the second connection point E. A first capacitor $C_s$ is connected between the first connection point D and the second connection point E.

An auxiliary switching device $S_a$ is connected between the first connection point D and the third interfacing point C. The auxiliary switching device may, for example, be a MOSFET. In FIGS. 4a and 4b, the auxiliary switching device $S_a$ is coupled with an antiparallel fourth diode $D_{s4}$, e.g., a freewheeling diode, and an drain-source capacitor $C_{ds,Sa}$. In the case of a MOSFET switching device, a body diode of the switching device may act as the freewheeling diode. The auxiliary switching device $S_a$ may be controlled to turn on at zero-current and to turn off at zero voltage.

In FIGS. 4a and 4b, each first diode $D_{s1,n}$ (n∈{1 . . . x}), together with the second diode $D_{s2}$ and the third diode $D_{s3}$, forms a path between the corresponding first interfacing point $A_n$ and the second interfacing point B through the third interfacing point C in such a manner that the first diode $D_{s1,n}$, the second diode $D_{s2}$, and the third diode $D_{s3}$ are forward-biased in a first direction along the path. The switching device $S_a$ is configured to control a flow of current in the first direction.

In the first variant 41 shown in FIG. 4a, the first direction is from the first interfacing points $A_1$ to $A_x$ to the second interfacing point B through the third interfacing point C. In other words, the first diodes $D_{s1,1}$ to $D_{Ss1,x}$, the second diode $D_{s2}$, and the third diode $D_{s3}$ are forward-biased in a direction from the first interfacing points $A_1$ to $A_x$, through the third interfacing point C, to the second interfacing point B, and the switching device $S_a$ is configured to control a flow of current in this direction.

In the second variant 42 shown in FIG. 4b, the first direction is from the second interfacing point B to the second interfacing points $A_1$ to $A_x$ through the third interfacing point C. The first diodes $D_{s1,1}$ to $D_{s1,x}$, the second diode $D_{s2}$, and the third diode $D_{s3}$ are forward-biased in a direction from the second interfacing point B to the first interfacing points $A_1$ to $A_x$ through the third interfacing point C, and the switching device $S_a$ is configured to control a flow of current in this direction.

The exemplary snubber topology disclosed herein is able to work in different converter topologies, including multi-phase and three-level converter structures. A power converter suitable that includes the exemplary active snubber topology of the present disclosure can include a main diode device connected between a first node $A_1'$ and a second node $B'$, and a main switching device connected between the first node $A_1'$ point and a third node $C'$. The power converter may further include a current source connected to the first node $A_1'$. For example, a main inductor may act as a current source on the time scale of a switching period of the main switching device. The power converter may also have a voltage source having its terminal connected to the second node $B'$. For example, a main capacitor may act as a voltage source on the time scale of a switching period of the main switching device.

When the power converter has more than one phase, the power converter can include main diodes connected between a plurality of first nodes $A_1'$ to $A_x'$ and the second node $B'$, main switching devices connected between the first nodes $A_1'$ to $A_x'$ and the third node $C'$, and current sources connected to the first nodes $A_1'$ to $A_x'$.

In order to utilise the exemplary snubber topology of the present disclosure, each first interfacing point A, (n E of the snubber implementation may be connected to one of the first nodes $A_1'$ to $A_x'$, e.g., to a common node between a main switch, a main diode, and a current source of a phase of the converter. The number of first interfacing points depends on the number of phases in the converter. The second interfacing point B may be connected to the second node point $B'$, e.g., a common node of the main diode and the voltage source. The third interfacing point C may be connected to the third node $C'$, e.g., a common node of the main switch and the voltage source.

FIG. 5 illustrates an exemplary boost converter having a snubber circuit in accordance with an exemplary embodiment of the present disclosure. A main diode D is connected between a first node $A'$ and a second node $B'$. A main switching device S is connected between the first node $A'$ point and a third node $C'$. In FIG. 5, the main switching device S is a MOSFET. The main switching device S includes a body diode acting as a freewheeling diode.

The boost converter is supplied by an input voltage supply $V_{in}$. The positive pole of the voltage supply $V_{in}$ is connected to one end of an inductor L. The inductor L acts as a current source. The other terminal of the inductor L is connected to the first node $A'$. The negative pole of the current source forms the third node $C'$ in FIG. 5.

The converter also includes a voltage source in the form of a main capacitor C having one terminal connected to the second node $B'$. In FIG. 5, the negative pole of the input voltage supply $V_{in}$ is connected to the other pole of the capacitor C.

The power converter also includes an exemplary snubber circuit according to the snubber topology of an exemplary embodiment of the present disclosure, as also shown in FIG. 5. As the power converter in FIG. 5 has one output phase, the snubber circuit has one first interfacing point $A_1$ which is connected to the first node $A_1'$. Thus, the first interfacing point $A_1$ is connected to a common node of the main switch, main diode and the current source. The second interfacing point B is connected to the second node point $B'$, e.g., a common node of the main diode and the voltage source. The third interfacing point C is connected to third node $C'$, e.g., a common node of the main switch and the voltage source.

In an exemplary embodiment, the main circuit of a converter can be configured such that the current flows from the first node $A_1'$ to the second node $B'$. According to this embodiment the first variant 41 may be used, as also shown in FIG. 4a. FIG. 5 shows such a configuration.

In another exemplary embodiment, the main circuit can be configured such that the current flows from the second node $B'$ to the first node $A_1'$. According to this embodiment, the second variant 42 can be used as illustrated in FIG. 4b.

FIGS. 6a to 6i illustrate operational modes of the boost converter of FIG. 5 in accordance with an exemplary embodiment of the present disclosure. Operation of the boost converter in FIG. 5 may be divided into nine consecutive operating modes. FIGS. 6a to 6i illustrate these modes in the boost converter of FIG. 5.

Figure 6A:
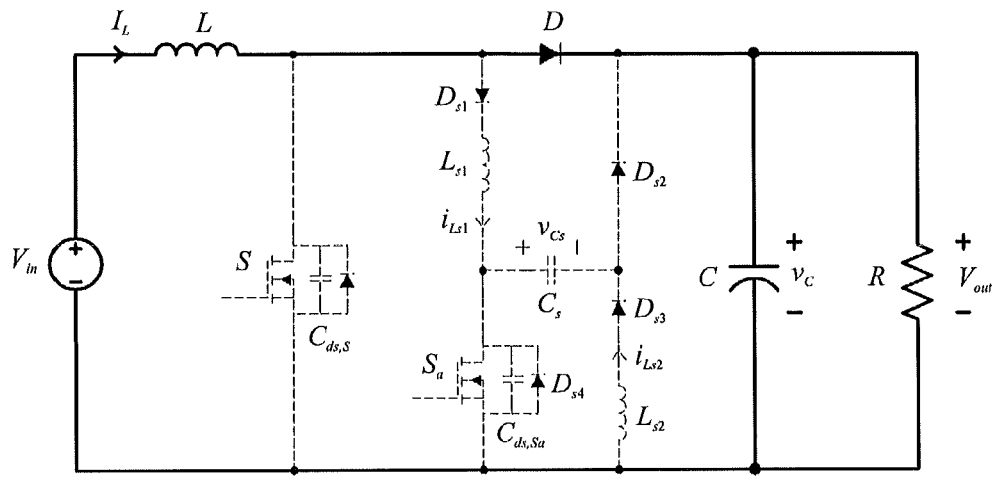
FIGS. 6a to 6i illustrate operational modes of the boost converter of FIG. 5 in accordance with an exemplary embodiment of the present disclosure.

FIG. 6a illustrates Mode 1. In Mode 1 ($t_0 \leq t < t_1$), the main switching device S is off and the diode D is on. The converter operates in the off-state until the auxiliary switch $S_a$ turns on at $t=t_1$.

Figure 6B:
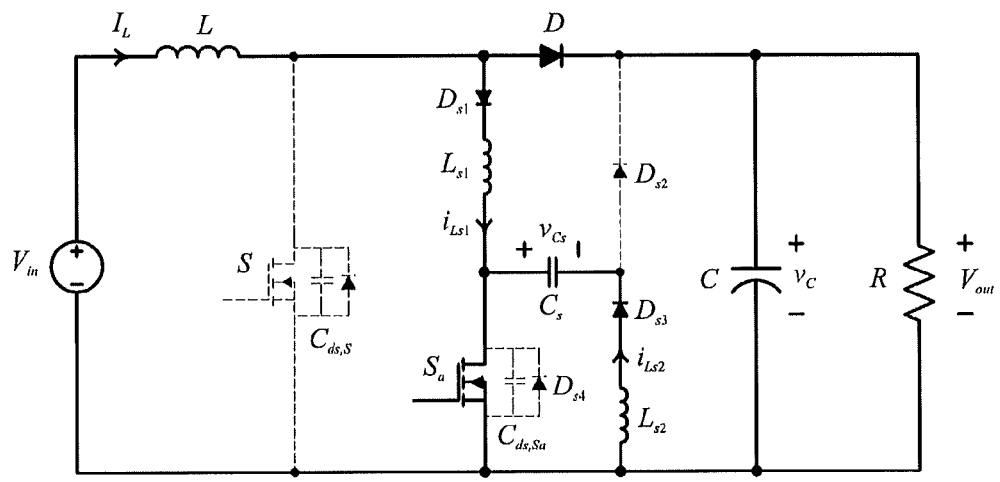

FIG. 6b illustrates Mode 2. In mode 2 ($t_1 \leq t < t_2$), the auxiliary switching device $S_a$ turns on at zero-current (at $t=t_1$) due to the presence of $L_{s1}$ and $L_{s2}$. Current $i_D$ of the main diode D starts to decrease and, correspondingly, current $i_{Sa}$ of the auxiliary switch $S_a$ starts to increase until $i_D$ equals to zero and $i_{Sa}$ equals to the input current $I_{in}$. The rate of change $di_D/dt$ of the current $I_D$ is limited by $L_{s1}$, and, thus, the reverse recovery current of D and the reverse recovery losses are reduced. A first resonant path, $L_{s2}$-$D_{s3}$-$C_s$-$S_a$, is excited when the auxiliary switch $S_a$ is closed. This resonance ends when current $i_{Ls2}$ of the second inductor $L_{s2}$ equals to zero.

Figure 6C:
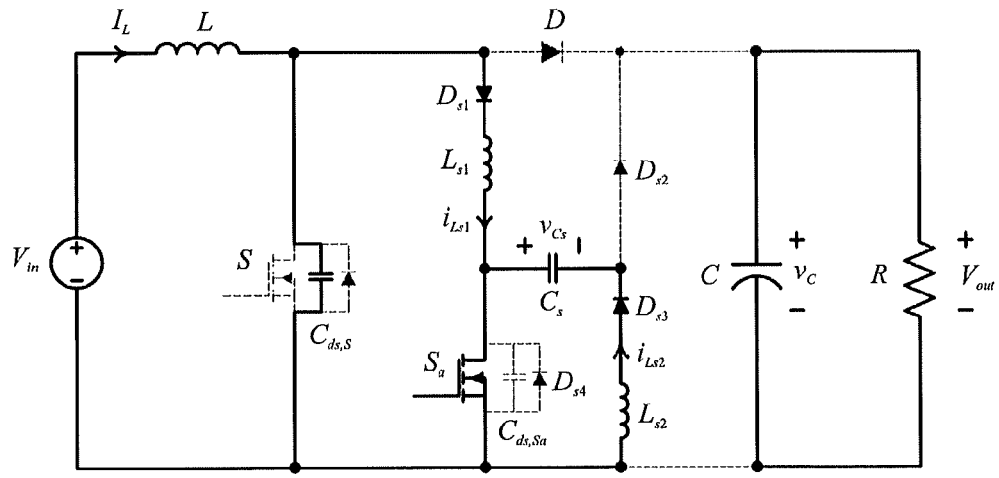

FIG. 6c illustrates Mode 3 ($t_2 \leq t < t_3$) which starts when current $i_{Ls1}$ of the snubber first inductor $L_{s1}$ equals to input current $I_{in}$. The resonance process in the first resonance path $L_{s2}$-$D_{s3}$-$C_s$-$S_a$ is still resonating and a second resonance path, $C_{ds,S}$-$D_{s1}$-$S_a$, is generated. The drain-source capacitor $C_{ds,S}$ of the main switch S starts to discharge in this mode.

Figure 6D:
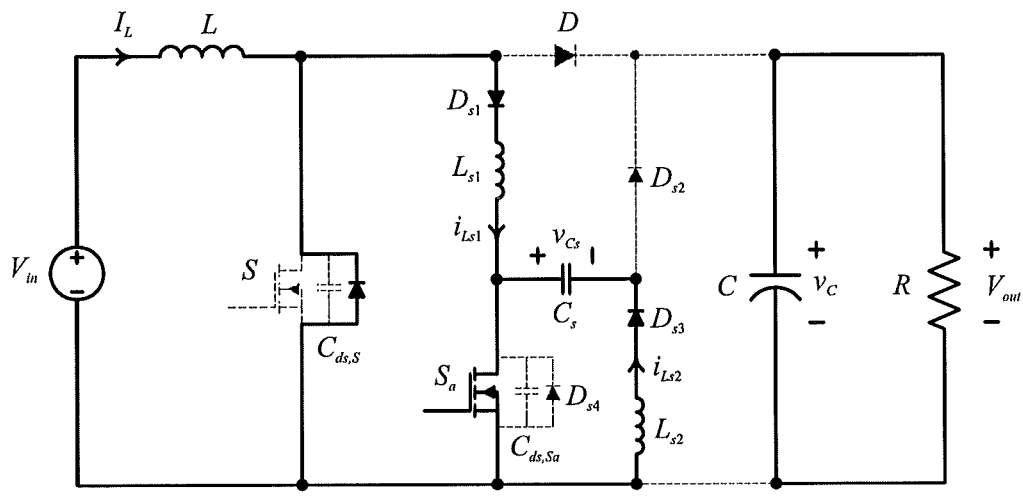

FIG. 6d illustrates Mode 4 ($t_3 \leq t < t_4$) which starts when the drain-source capacitor $C_{ds,S}$ is fully discharged and the voltage $V_{Cds,S}$ over it is equal to zero as the body diode of the main switch S clamps the voltage. The first resonance path $L_{s2}$-$D_{s3}$-$C_s$-$S_a$ is still resonating in this mode. Mode 4 ends as the gate signal is applied to the main switch S and the main switch S turns on at zero-voltage.

Figure 6E:
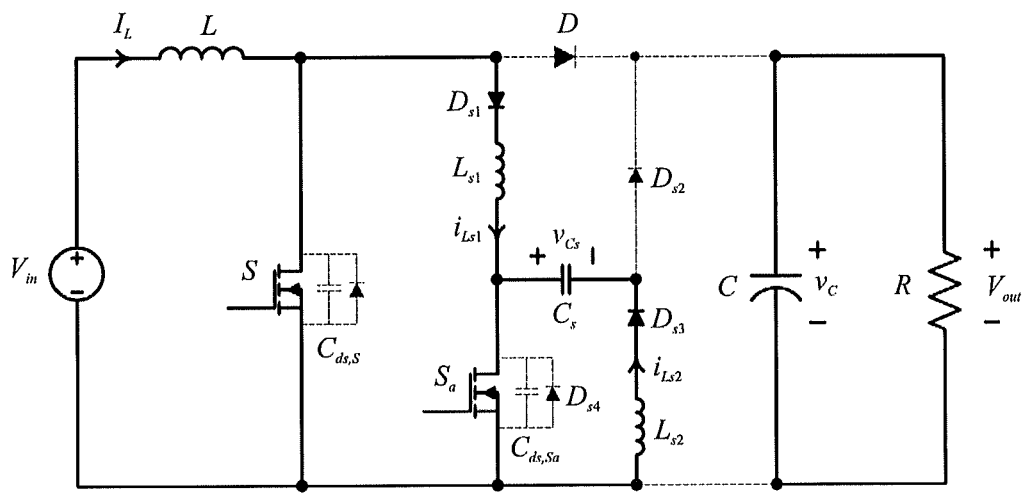

FIG. 6e illustrates Mode 5. The operation of Mode 5 ($t_4 < t < t_5$) is similar to Mode 4 but the current in the second resonant path $C_{ds,S}$-$D_{s1}$-$L_{s1}$-$S_a$ flows through the main switch S rather than through the body diode of the main switch S as the gate signal has already been applied. In order to ensure that the auxiliary switch $S_a$ later turns off at zero-voltage, voltage $v_{Cs}$ over the first capacitor $C_S$ charges to $-V_{out}$ through the first resonance path $L_{s2}$-$D_{s3}$-$C_s$-$S_a$. Mode 5 ends when the resonance in the first resonance path $L_{s2}$-$D_{s3}$-$C_s$-$S_a$ is finished.

Figure 6F:
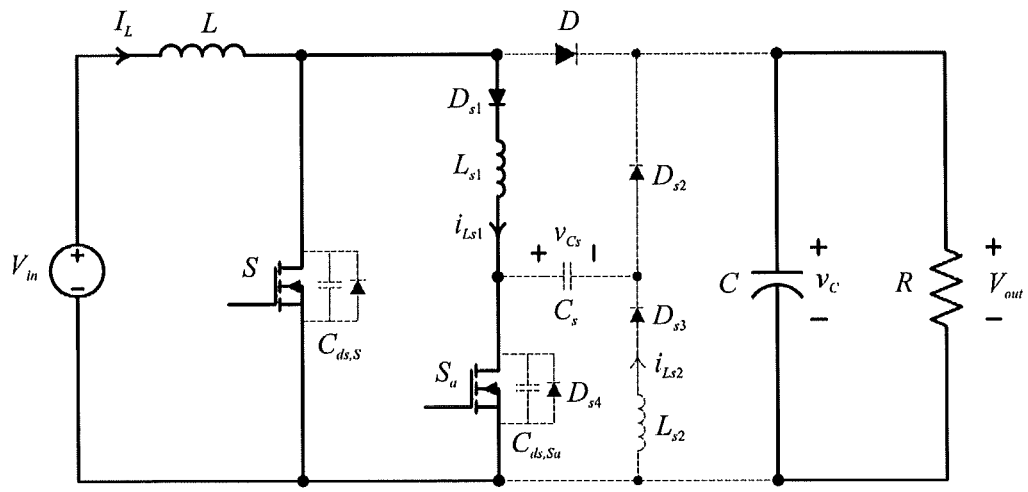

FIG. 6f illustrates Mode 6. In Mode 6 ($t_4 \leq t < t_5$), the input current $I_{in}$ circulates through the auxiliary switch $S_a$ while the energy stored in $L_s$ from $C_{ds,S}$ circulates through the main switch S. The current circulating in the second resonant path (now S-$D_{s1}$-$L_{s1}$-$S_a$) creates additional conducting state losses. Thus, it may be desirable to minimize the duration of Mode 6.

Figure 6G:
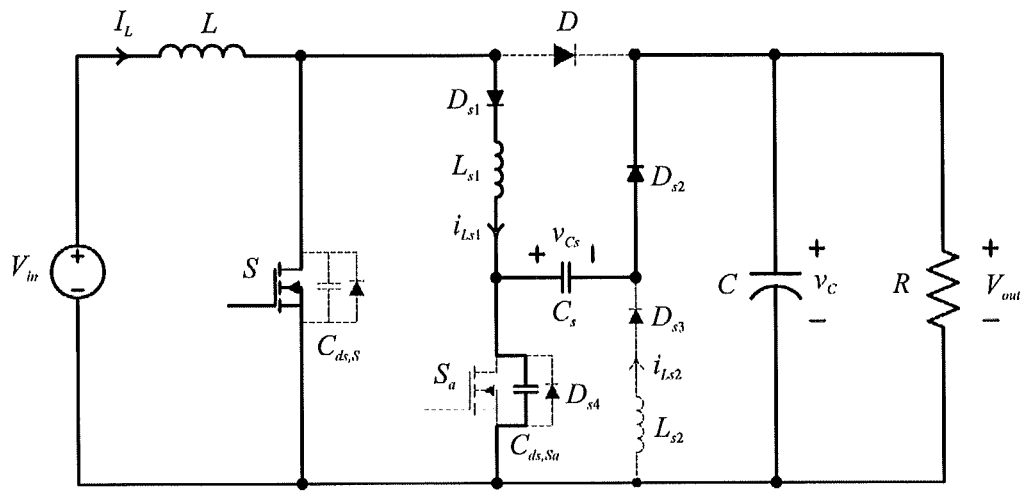

FIG. 6g illustrates Mode 7 ($t_5 \leq t < t_6$), which starts when the auxiliary switch $S_a$ is turned off. As $v_{Cs}$ was charged to $-V_{out}$ in Mode 5, the auxiliary switch $S_a$ can now turn off at zero-voltage. The drain-source capacitor $C_{ds\_Sa}$ of the auxiliary switch $S_a$ is charged by the current $i_{Ls1}$ until the sum of auxiliary switch drain-source capacitor voltage $V_{Cds,Sa}$ and the inversed first capacitor voltage $-v_{Cs}$ equals to the output voltage $V_{out}$. Then, $i_{Ls1}$ starts to charge the auxiliary switch drain-source capacitor $C_{ds\_Sa}$ and discharge the first snubber capacitor $C_s$ until $i_{Ls}$ equals to zero.

Figure 6H:
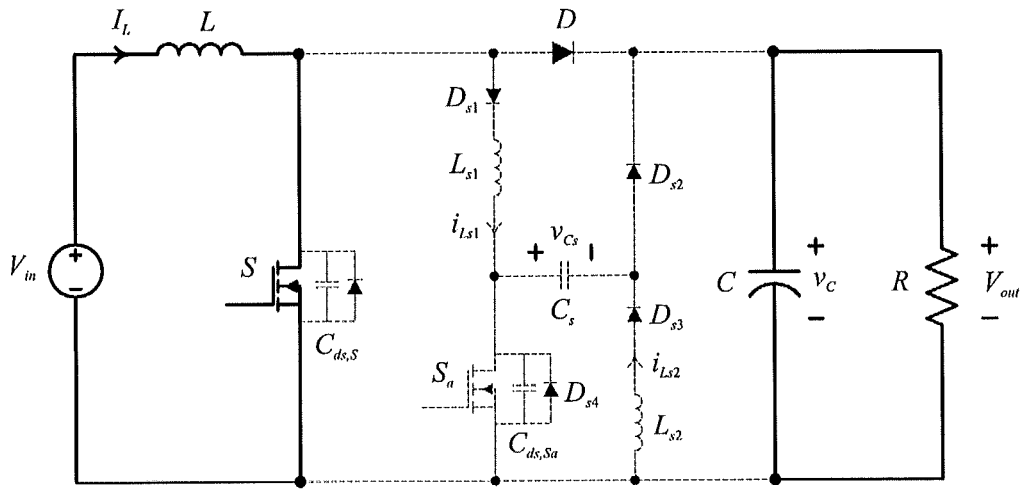

FIG. 6h illustrates Mode 8. Mode 8 ($t_6 \leq t < t_7$) starts when the first inductor $L_{s1}$ is fully discharged. The converter operates in the normal on-state operation. Mode 8 ends when desired pulse width is reached, e.g., $t=DT_s$, D being the desired pulse ratio and $T_s$ being the cycle length.

Figure 6I:
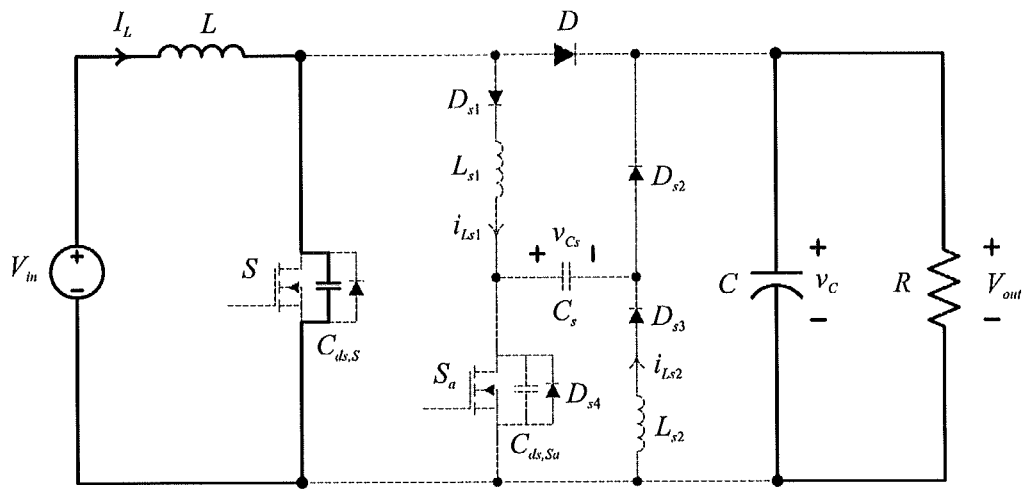

FIG. 6i illustrates Mode 9 ($t_7 \leq t < t_8$), which starts when the main switch S turns off. The main switch S turns off at zero-voltage because of the presence of the main switch drain-source capacitor $C_{ds,S}$. Mode 9 ends when $V_{Cds,S}$ equals to the output voltage $V_{out}$.

The components of the snubber topology of the present disclosure may be rated in the following manner, for example. The inductance of $L_{s1}$ depends on the reverse recovery characteristic of the main diode. The following equation gives a guideline for determining an approximate value of $L_{s1}$ $$L_{s1} = \frac{2\Delta Q_{rr} V_{out}}{(1+S_{rr})I_{rr}^2}, \quad (1)$$

where $I_{rr}$ is the peak reverse recovery current, and $S_{rr}$ is the snappiness factor of the main diode. $Q_{rr}$ is the reverse recovery charge of the diode. The inductance of $L_{s1}$ may be adjusted by experimentation if these parameters are not be given in the datasheet of the main diode.

The drain-source capacitance $C_{ds,S}$ of the main switch S may be designed to absorb voltage stress introduced by parasitic inductance on the PCB of the switching loop in the converter. At the same time, however, current stress on the auxiliary switching device $S_a$ at turn-on is proportional to the size of the drain-source capacitance $C_{ds,S}$ of the main switching device S.

Turn-on switching losses of the auxiliary switch $S_a$ are proportional to the drain-source capacitance $C_{ds,Sa}$ of the auxiliary switching device $S_a$ since the energy stored in the drain-source capacitance $C_{ds,Sa}$ is discharged internally when $S_a$ turns on.

Therefore, it may be desirable to minimize the drain-source capacitances of the main switching device and the auxiliary switching device in order to minimize the current stress and turn-on switching losses of the auxiliary switching device $S_a$.

During operation (at the end of mode 5), energy stored in $L_{s1}$ is transferred to $C_{ds,Sa}$ and C. Accordingly, capacitance of the first capacitor $C_s$ may be defined as follows:

$$C_s = \frac{L_{s1}}{v_{C_{ds,Sa}}^2}\left(I_{in} + V_{out}\sqrt{C_{ds,S}}\right)^2 - C_{ds,Sa}, \quad (2)$$

where $v_{C_{ds,Sa}}$ is the voltage over the drain-source capacitor $C_{ds,Sa}$ of the auxiliary switching device $S_a$. $v_{C_{ds,Sa}}$ can be dimensioned on the basis of the voltage rating of the switching device.

$L_{s2}$ provides zero-current turn-on switching conditions for the auxiliary switching device $S_a$ by suppressing the current stress from $C_s$. The value of $L_{s2}$ can be determined as follows, $$L_{s2} = C_s \left(\frac{V_{out}}{\hat{i}_{L_{s1}}}\right)^2 \quad (3)$$

where $V_{out}$ is the output voltage and $\hat{i}_{L_{s1}}$ is the current of the first inductor $L_{s1}$.

FIGS. 7a to 7m illustrate exemplary snubber topologies of various power converters in accordance with an exemplary embodiment of the present disclosure. The implementation of the snubber topology of the present disclosure is not limited only to implementations in boost converters as in FIG. 5. The exemplary snubbers disclosed herein are able to work in various converter topologies, including multiphase and three-level converter structures. FIGS. 7a to 7k show some examples of implementations of the snubber topology in accordance with in various power converters. Depending on the topology, the first variant 41 shown in FIG. 4a, the second variant 42 shown in FIG. 4c, or both are used in the power converter.

Figure 7A:
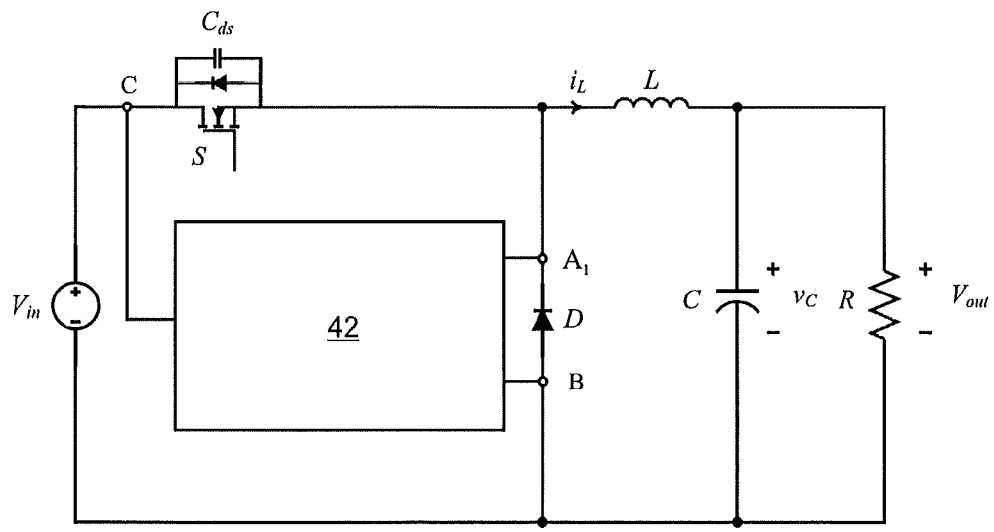
FIGS. 7a to 7m illustrate exemplary snubber topologies of various power converters in accordance with an exemplary embodiment of the present disclosure.
Figure 7B:
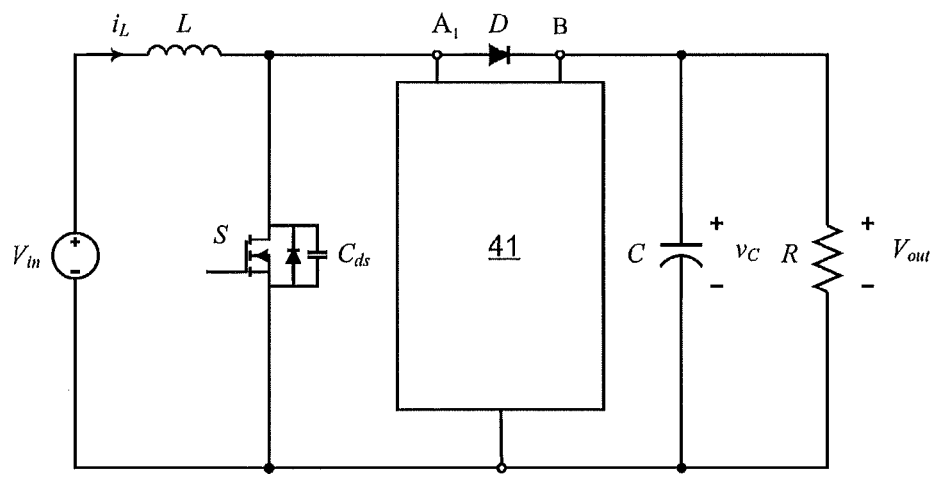
Figure 7C:
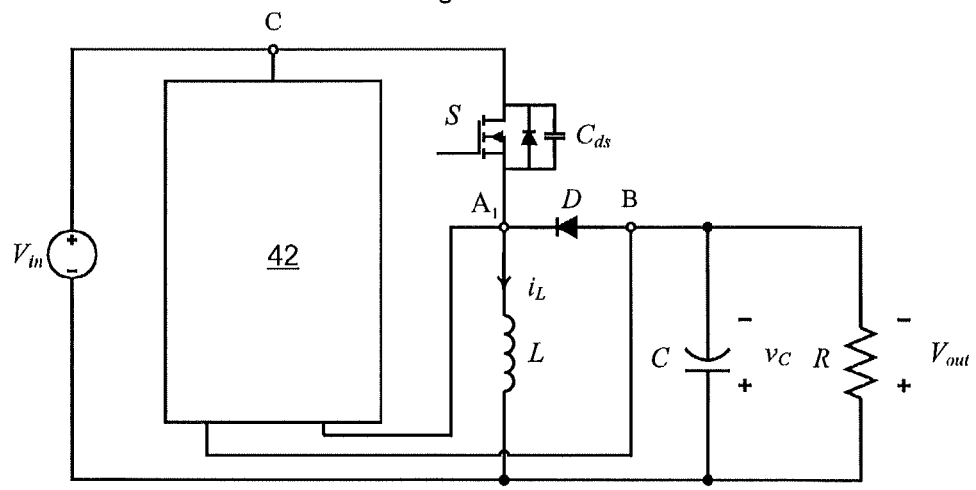

FIG. 7a shows a variant of the exemplary snubber topology implemented in a buck converter, FIG. 7b shows a variant implemented in a boost converter, and FIG. 7c shows a variant implemented in a buck-boost converter.

Figure 7D:
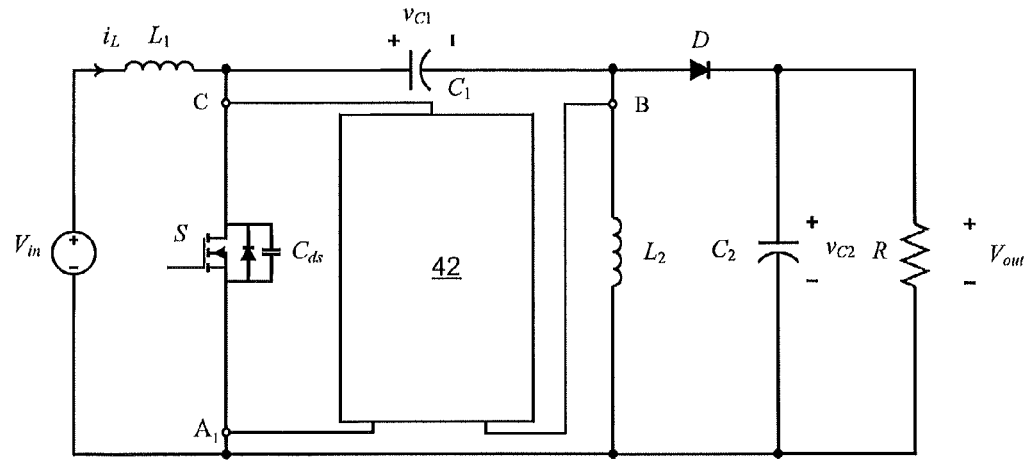
Figure 7E:
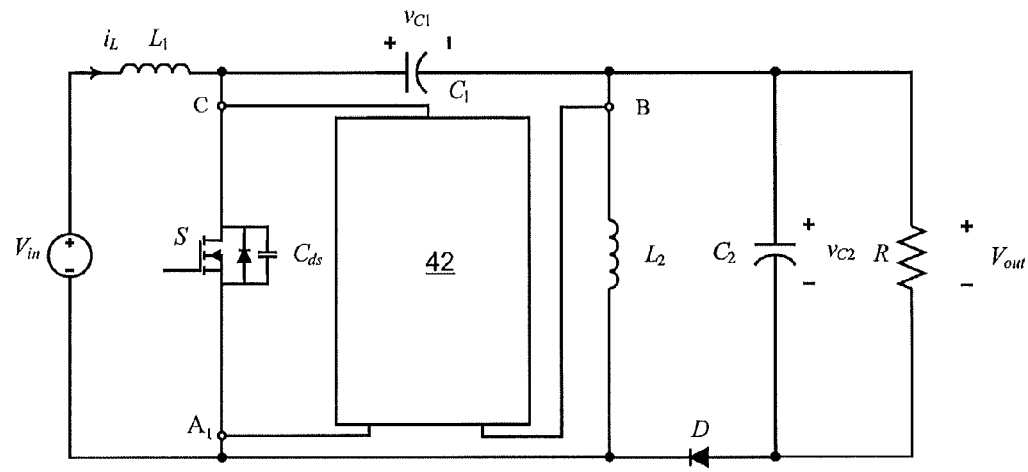

FIG. 7d shows a variant of the exemplary snubber topology implemented in a SEPIC converter. In FIG. 7d, the first interfacing point $A_1$ is not physically connected to a common node between a main switch, a current source, and a main diode because the main diode D does not physically share a common node with the switch S and the inductor $L_2$ acting as the current source. However, the path formed by the diode D and a parallel connection of a capacitor $C_2$ and a load R can be replaced with an equivalent path where the places of the diode D and the parallel connection of the capacitor $C_2$ and the load R have been interchanged. FIG. 7e shows an example of such a replacement. Therefore, the diode can be considered to effectively share a common node with the switch S and the inductor $L_2$. Thus, the first interfacing point $A_1$ in FIG. 7d is effectively connected to a common node of the main switch S, main diode D, and the current source $L_2$.

Figure 7F:
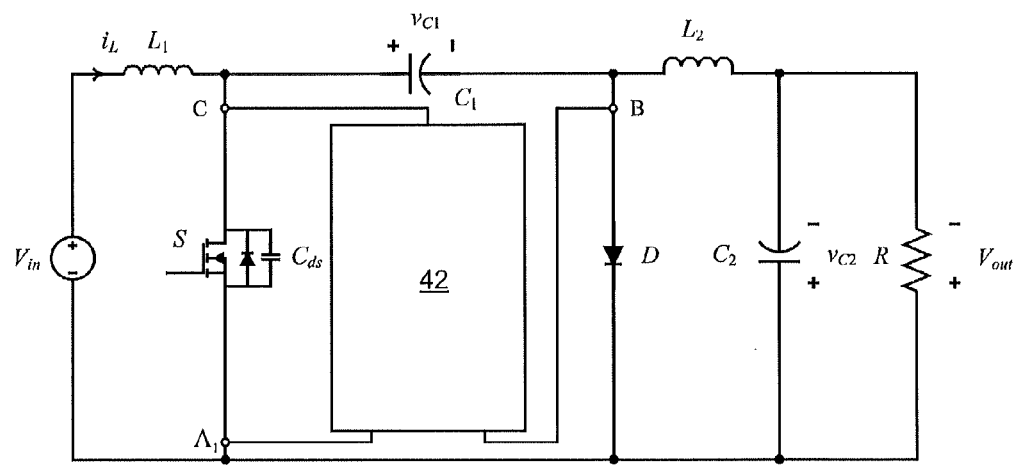

FIG. 7f shows a variant of the exemplary snubber topology disclosed herein implemented in a Ćuk converter. In FIG. 7f, an inductor $L_2$ acting as a current source does not physically share a common node with a main switch S and a main diode D. Similarly, in FIG. 7d, the path formed by the inductor $L_2$ and a parallel connection of a capacitor $C_2$ and a load R can be replaced with an equivalent path where the places of the inductor $L_2$ and the parallel connection of the capacitor $C_2$ and the load R have been interchanged. Therefore, the inductor $L_2$ can be considered to effectively share a common node with the switch S and the diode D. Thus, the first interfacing point $A_1$ in FIG. 7f is effectively connected to a common node of the main switch S, main diode D, and the current source $L_2$.

Figure 7G:
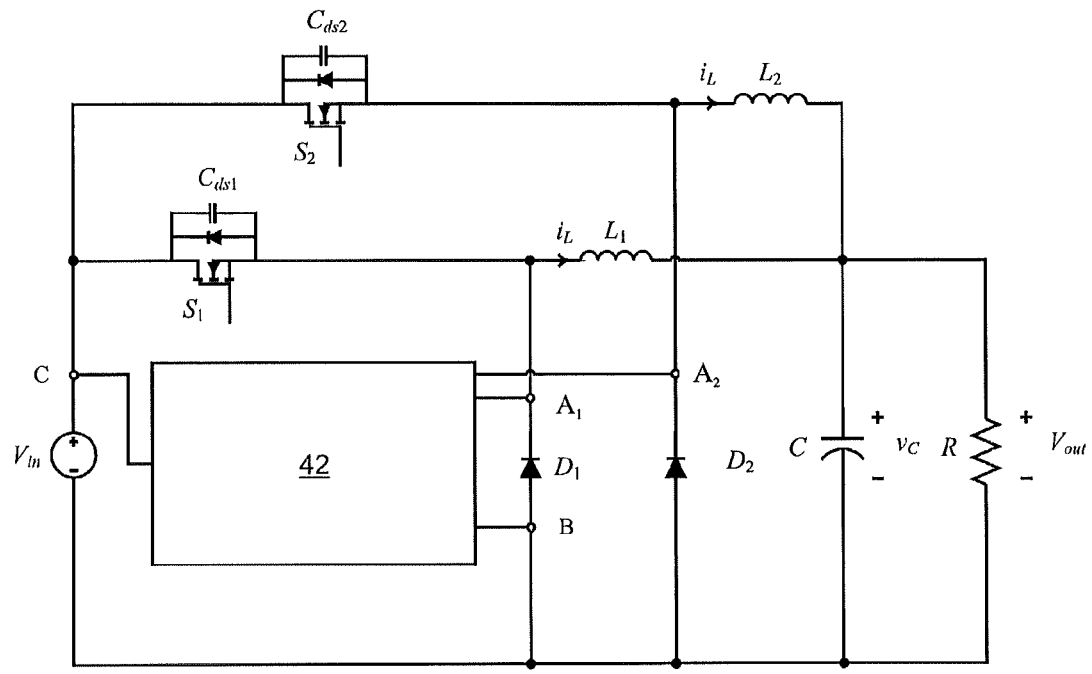
Figure 7H:
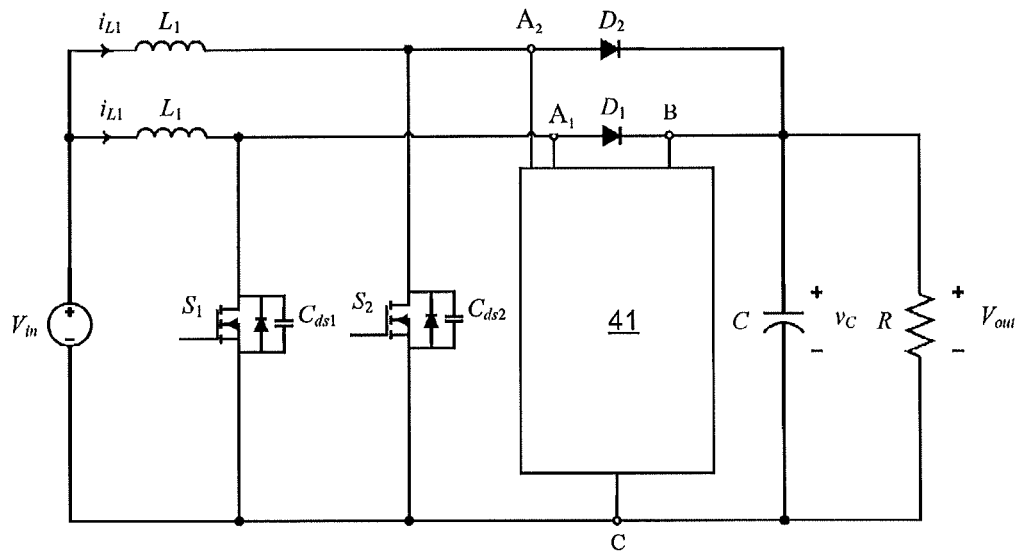
Figure 7I:
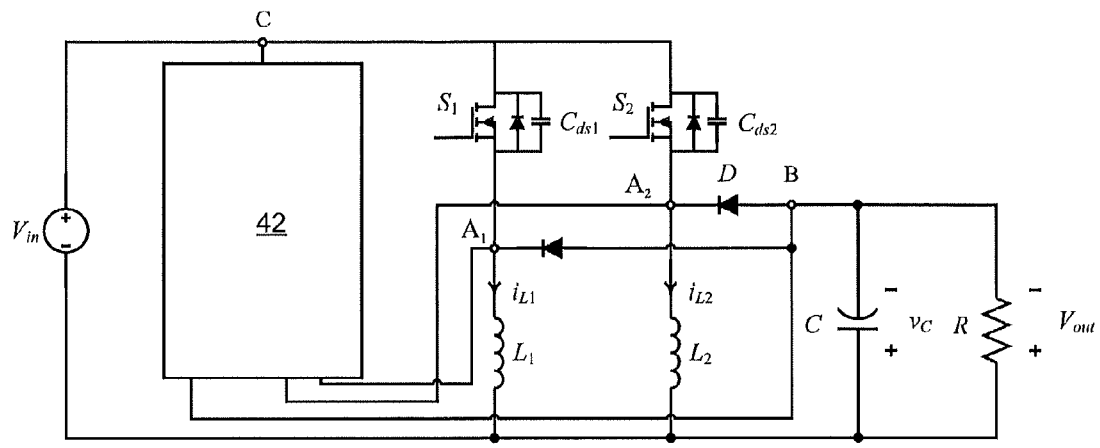
Figure 7J:
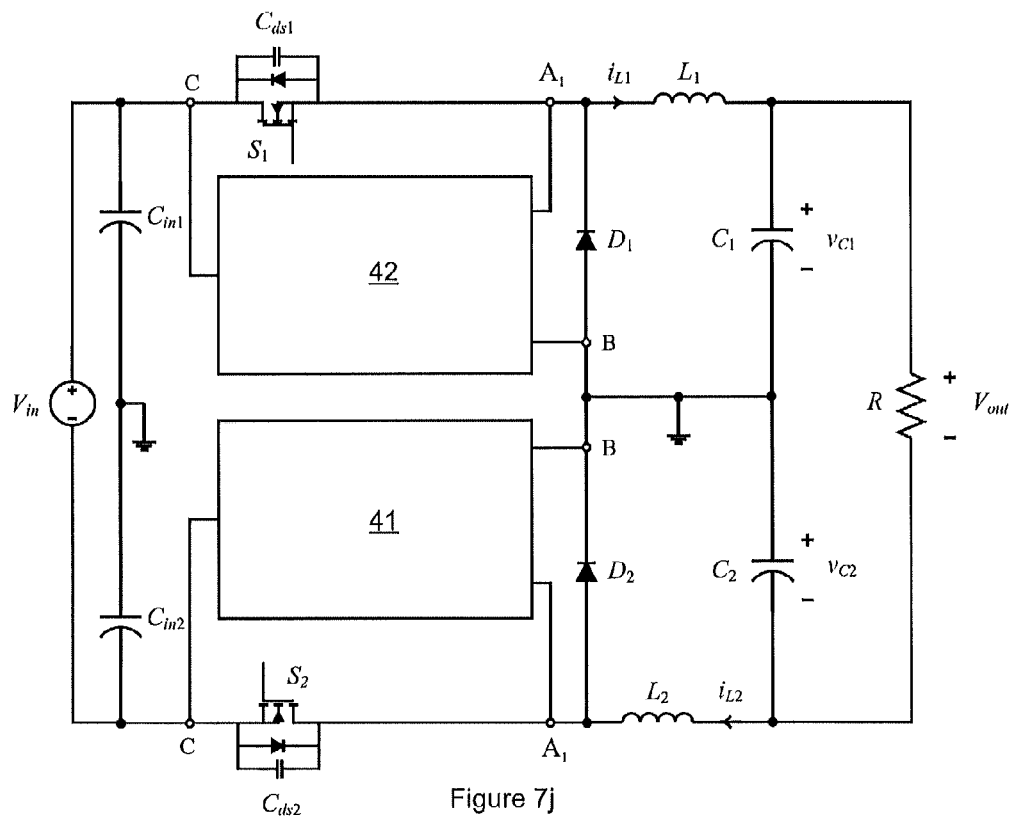

FIG. 7g shows a variant of the exemplary snubber topology of the present disclosure implemented in a two-phase buck converter. FIG. 7h shows a variant implemented in a two-phase boost converter. FIG. 7i shows a variant in a two-phase buck-boost converter. FIG. 7j shows a variant implemented in a three-level buck converter.

Figure 7K:
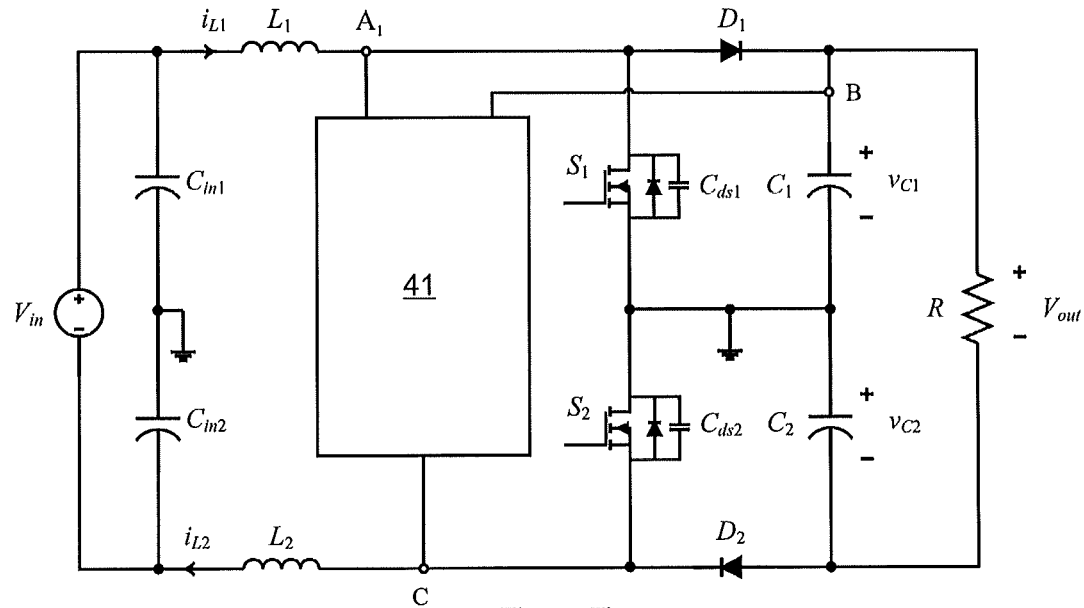
Figure 7L:
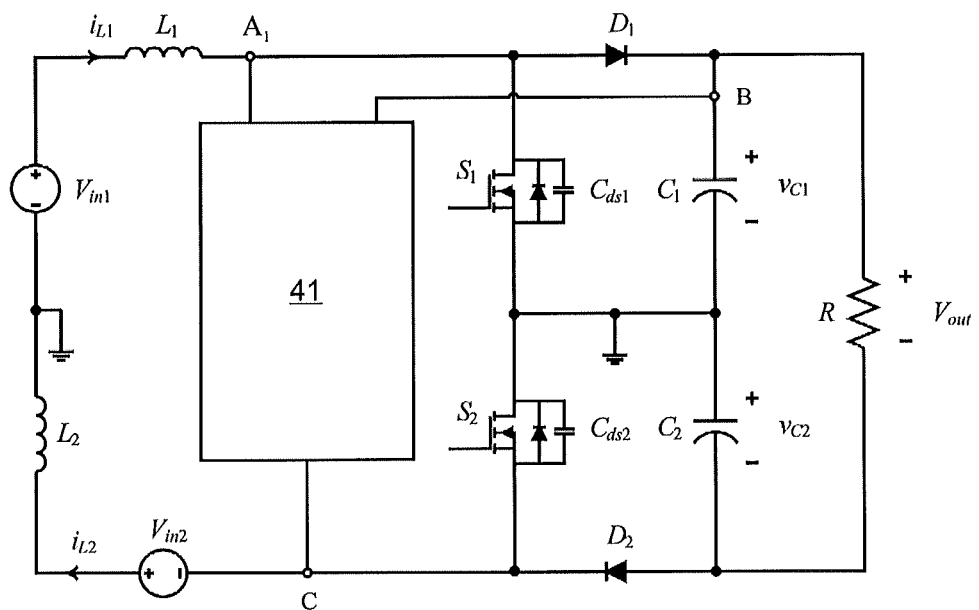

FIG. 7k shows a variant implemented of the exemplary snubber topology in a three-level boost converter. In FIG. 7j, the third interfacing point C is not physically connected to a voltage source. However, the parallel connection of the voltage source $V_{in}$ and the capacitors $C_{in1}$ and $C_{in2}$ can be replaced with an equivalent circuit including two series-connected voltage sources having their interconnection point connected to the ground. These voltage sources, together with the inductors $L_1$ and $L_2$, form two series-connected circuits in which places of the elements can be freely interchanged. FIG. 7I shows such an equivalent circuit where one of the two equivalent voltage sources $V_{in1}$ and $V_{in2}$ shares a common node with a main switch $S_2$. Thus, the third point C in FIG. 7k can also be considered to be effectively connected to a common node between a main switch and a voltage source.

Figure 7M:
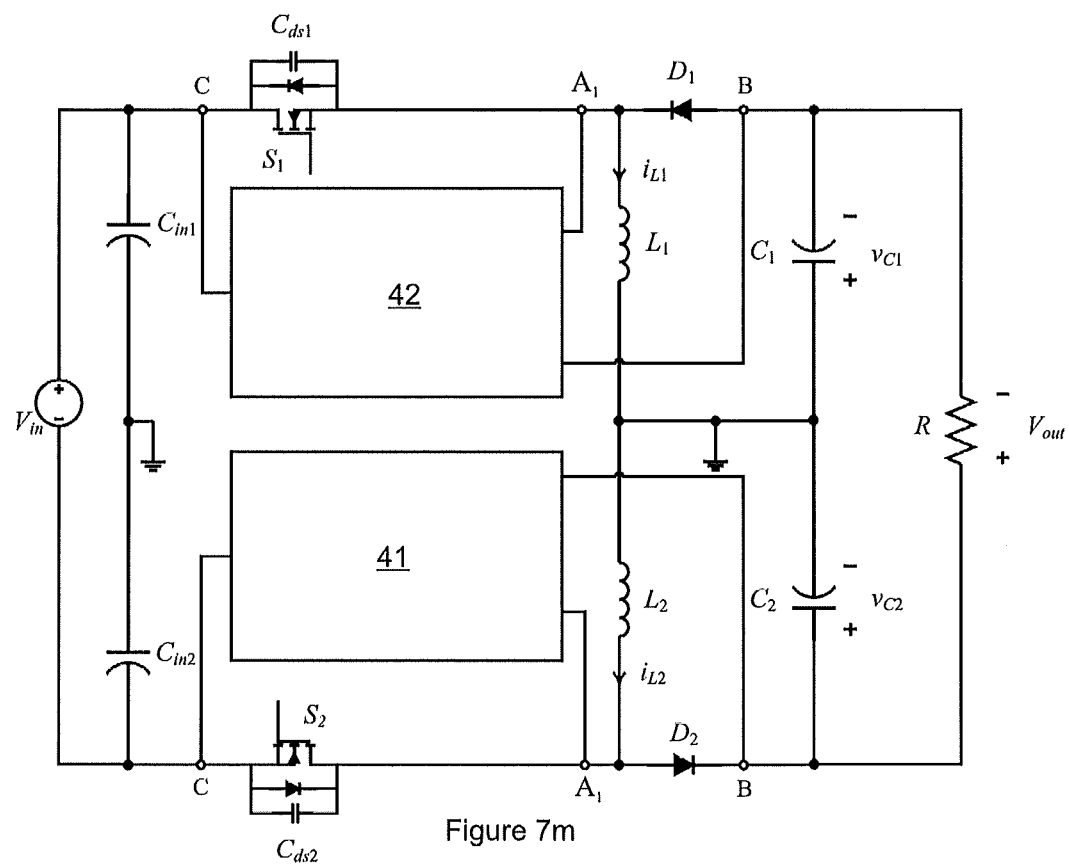

FIG. 7m shows a variant of the exemplary snubber topology of the present disclosure implemented in a three-level buck-boost converter.

Operation of the exemplary snubber topology disclosed herein was tested by computer simulation, PSIM. The boost converter including the exemplary snubber variant as shown in FIG. 5 was used for the simulations. The results are shown in FIG. 8 and FIG. 9.

Figure 8:
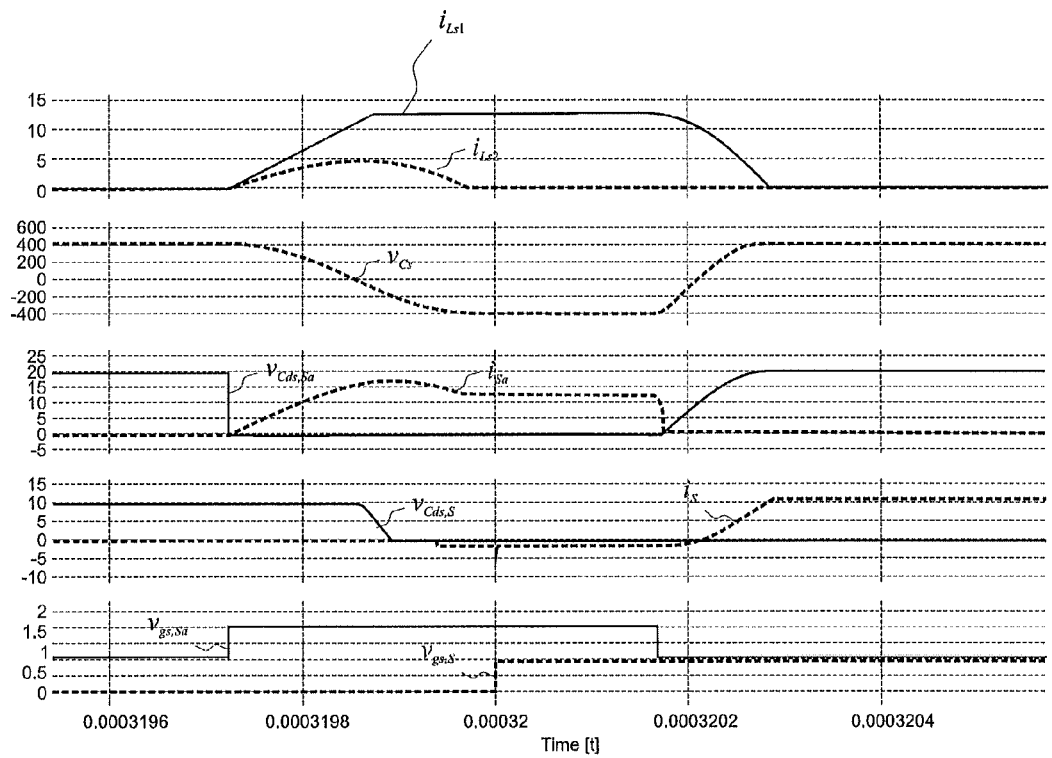
FIG. 8 illustrates simulated switching waveforms of a turn-on event of the main switch of a converter in accordance with an exemplary embodiment of the present disclosure.

FIG. 8 illustrates simulated switching waveforms of a turn-on event of the main switch of a converter in accordance with an exemplary embodiment of the present disclosure. FIG. 8 shows simulated switching waveforms of a turn-on event of the main switch S. In FIG. 8, the gate signal $v_{gs,Sa}$ of the auxiliary switch $S_a$ is applied before the gate signal $v_{gs,S}$ of the main switch S in order to create the zero-voltage turn-on conditions for the main switch S. The auxiliary switch $S_a$ turns on and off at zero current and at zero voltage, respectively. $V_{Cds,S}$ and $i_S$ are simulated voltage and current waveforms of main switch S; $v_{Cds,Sa}$ and $i_{Sa}$ are simulated voltage and current waveforms of the auxiliary switch $S_a$; and $i_{Ls1}$ and $i_{Ls1}$ are currents of the first inductor $L_{s1}$ and the second inductor $L_{s2}$. As shown in FIG. 8, there was virtually no overlap between the voltage and current, and the switching losses were nearly completely eliminated.

Figure 9:
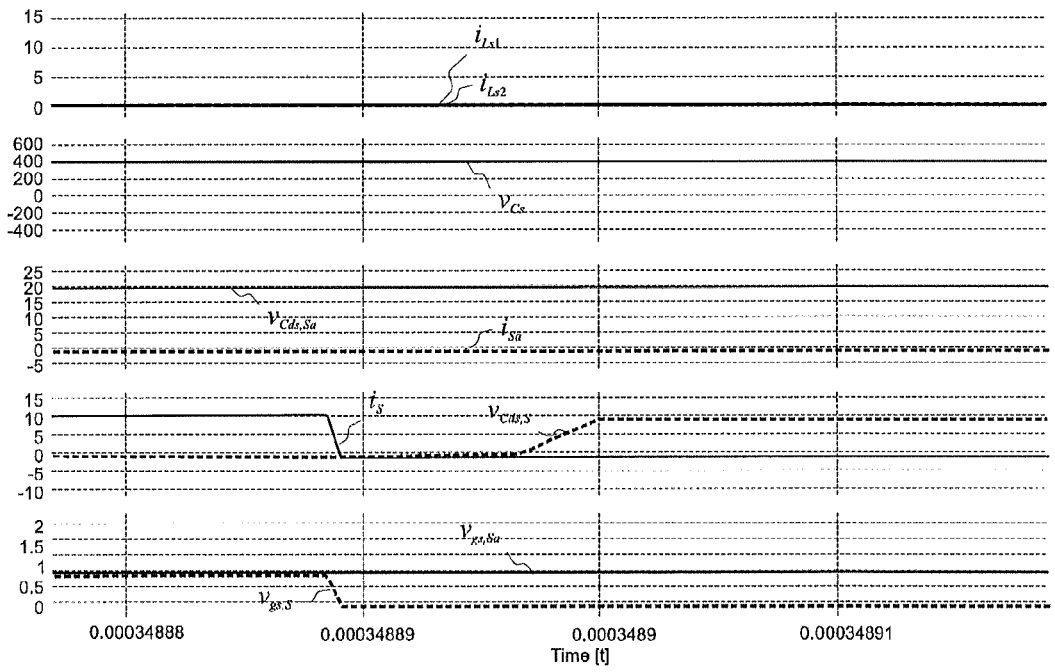
FIG. 9 illustrates simulated waveforms of the main switch of a converter at turn-off in accordance with an exemplary embodiment of the present disclosure.

FIG. 9 illustrates simulated waveforms of the main switch of a converter at turn-off in accordance with an exemplary embodiment of the present disclosure. FIG. 9 shows simulated waveforms of the same signals at turn-off of the main switch S. In FIG. 9, the main switch S turned off at zero-voltage, and, therefore, the switching losses were minimized.

Figure 10:
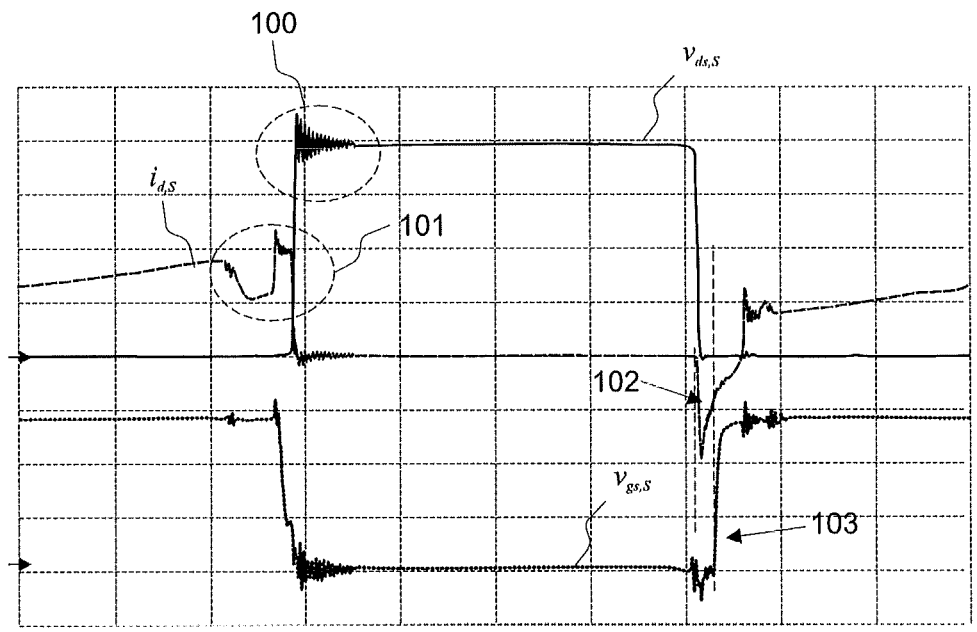
FIGS. 10, 11, and 12 illustrate experimental turn-on and turn-off waveforms in an exemplary converter having a snubber topology in accordance with an exemplary embodiment of the present disclosure.
Figure 11:
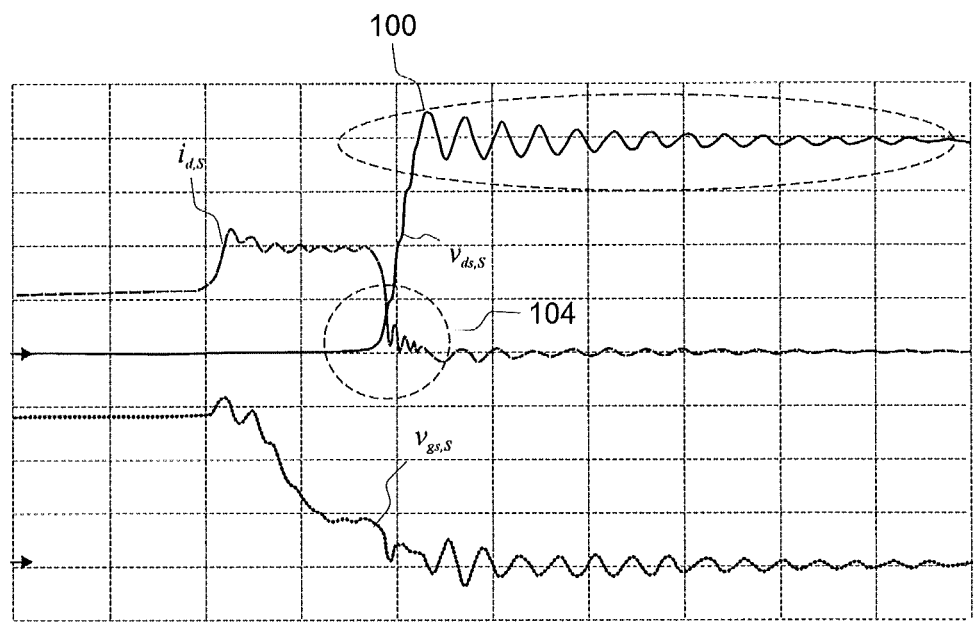
Figure 12:
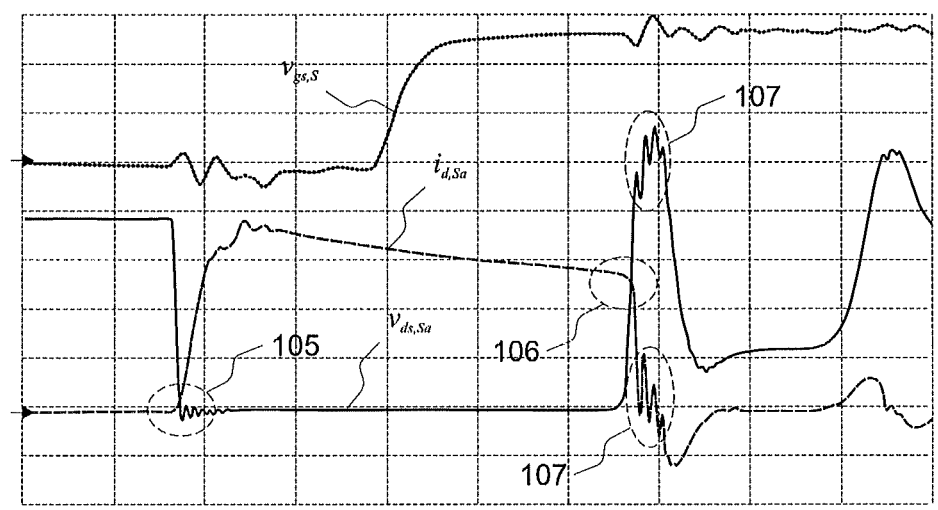

FIGS. 10, 11, and 12 illustrate experimental turn-on and turn-off waveforms in an exemplary converter having a snubber topology in accordance with an exemplary embodiment of the present disclosure FIG. 10 shows experimental turn-on and turn-off waveforms of one of the main switches in an exemplary interleaved (two-phase) boost DC/DC converter including an implementation of the exemplary snubber topology disclosed herein. In FIG. 10, the gate signal $v_{gs,S}$, the current $i_S$, and the voltage $V_{Cds,S}$ of one of the main switches are shown.

The gate signal $v_{gs,S}$ turns first off and then on. The current $i_S$ of this main switch S shows a notch at point 101 because of the interleaved operation of the boost converter. At point 102, the current $i_S$ shows a negative value as the current flows through the body diode of the main switch S. As can be seen at point 103, the main switch turns on at zero voltage. When the main switch turns on at 103, the current starts to flow through the channel of the S. Oscillations at point 100 are mainly due to stray inductances in the PCB routing of the converter.

FIG. 11 shows an enlarged portion of FIG. 10. As shown in FIG. 11, the main switch S turns off at virtually zero voltage at point 104. Therefore, the switching losses were minimized.

FIG. 12 shows the experimental turn-on and turn-off waveforms of the auxiliary switch $S_a$ of the snubber circuit used in FIGS. 10 and 11. In FIG. 12, the gate signal $v_{gs,S}$, the current $i_{Sa}$ of the auxiliary switch $S_a$, and the voltage $v_{Cds,Sa}$ of the auxiliary switch $S_a$ are shown. The auxiliary switch $S_a$ turns on almost at zero current at point 105, and thus the turn-on losses were minimized. FIG. 12 shows at point 106 that the turn-off of the auxiliary switch $S_a$ does not seem to occur at zero voltage. However, this was mainly due to the fact that the current measurement in the experimental set-up was not able to make a distinction between the current through the channel of the auxiliary switch $S_a$ and the current through the capacitor $C_{ds,Sa}$. As only their total current was measured instead of only the current through the channel, the turn-off seems to occur at non-zero current. The oscillations visible at points 107 were induced by the wiring of the current measurements.

It will be obvious to a person skilled in the art that the inventive concept can be implemented in various ways. The invention and its embodiments are not limited to the examples described above but may vary within the scope of the claims.

It will therefore be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

We claim:
1. A snubber circuit comprising:
   a first interfacing point, a second interfacing point, and a third interfacing point;
   a first connection point and a second connection point;
   a series connection of a first diode and a first inductor connected between the first interfacing point and the first connection point;
   a second diode connected between the second connection point and the second interfacing point;
   a series connection of a third diode and a second inductor connected between the third interfacing point and the second connection point;
   a switching device connected between the first connection point and the third interfacing point; and
   a first capacitor connected between the first connection point and the second connection point,
   wherein the first, the second, and the third diode are forward-biased in a first direction along a path between the first interfacing point and the second interfacing point and through the third interfacing point, and the switching device is configured to control a flow of current in the first direction.

2. The snubber circuit as claimed in claim 1, wherein the switching device is with an antiparallel fourth diode and a parallel capacitor.

3. The snubber circuit as claimed in claim 1, wherein the switching device is a MOSFET that includes a body diode.

4. The snubber circuit as claimed in claim 2, wherein the switching device is a MOSFET that includes a body diode.

5. The snubber circuit as claimed in claim 1, wherein the inductance of the first inductor ($L_{s1}$) is $$L_{s1} = \frac{2\Delta Q_{rr}V_{out}}{(1+S_{rr})I_{rr}^2},$$

where $I_{rr}$ is the peak reverse recover current, $S_{rr}$ is the snappiness factor of the main diode, and $Q_{rr}$ is the reverse recovery charge of the diode.

6. The snubber circuit as claimed in claim 1, wherein the capacitance of the first capacitor ($C_s$) is $$C_s = \frac{L_{s1}}{v_{C_{ds,Sa}}^2}\left(I_{in} + V_{out}\sqrt{C_{ds,S}}\right)^2 - C_{ds,Sa},$$

where $v_{C_{ds,Sa}}$ is the voltage over the drain-source capacitor $C_{ds,Sa}$ of the auxiliary switching device $S_a$, the voltage $v_{C_{ds,Sa}}$ being dimensioned on the basis of the voltage rating of the switching device.

7. The snubber circuit as claimed in claim 1, wherein the inductance of the second inductor ($L_{s2}$) is $$L_{s2} = C_s\left(\frac{V_{out}}{\hat{i}_{L_{s1}}}\right)^2,$$

where $V_{out}$ is the output voltage and $\hat{i}_{L_{s1}}$ is the current of the first inductor $L_{s1}$.

8. The snubber circuit as claimed in claim 1, wherein the first direction is from the first interfacing point to the second interfacing point through the third interfacing point.

9. The snubber circuit as claimed in claim 1, wherein the first direction is from the second interfacing point to the second interfacing point through the third interfacing point.

10. The snubber circuit as claimed in claim 2, wherein the inductance of the first inductor ($L_{s1}$) is $$L_{s1} = \frac{2\Delta Q_{rr}V_{out}}{(1+S_{rr})I_{rr}^2},$$

where $I_{rr}$ is the peak reverse recover current, $S_{rr}$ is the snappiness factor of the main diode, and $Q_{rr}$ is the reverse recovery charge of the diode.

11. The snubber circuit as claimed in claim 2, wherein the capacitance of the first capacitor ($C_s$) is $$C_s = \frac{L_{s1}}{v_{C_{ds,Sa}}^2}\left(I_{in} + V_{out}\sqrt{C_{ds,S}}\right)^2 - C_{ds,Sa},$$

where $v_{C_{ds,Sa}}$ is the voltage over the drain-source capacitor $C_{ds,Sa}$ of the auxiliary switching device $S_a$, the voltage $v_{C_{ds,Sa}}$ being dimensioned on the basis of the voltage rating of the switching device.

12. The snubber circuit as claimed in claim 2, wherein the inductance of the second inductor ($L_{s2}$) is $$L_{s2} = C_s\left(\frac{V_{out}}{\hat{i}_{L_{s1}}}\right)^2,$$

where $V_{out}$ is the output voltage and $\hat{i}_{L_{s1}}$ is the current of the first inductor $L_{s1}$.

13. The snubber circuit as claimed in claim 3, wherein the inductance of the first inductor ($L_{s1}$) is $$L_{s1} = \frac{2\Delta Q_{rr}V_{out}}{(1+S_{rr})I_{rr}^2},$$

where $I_{rr}$ is the peak reverse recover current, $S_{rr}$ is the snappiness factor of the main diode, and $Q_{rr}$ is the reverse recovery charge of the diode.

14. The snubber circuit as claimed in claim 3, wherein the capacitance of the first capacitor ($C_s$) is $$C_s = \frac{L_{s1}}{v_{C_{ds,Sa}}^2}\left(I_{in} + V_{out}\sqrt{C_{ds,S}}\right)^2 - C_{ds,Sa},$$

where $v_{C_{ds,Sa}}$ is the voltage over the drain-source capacitor $C_{ds,Sa}$ of the auxiliary switching device $S_a$, the voltage $v_{C_{ds,Sa}}$ being dimensioned on the basis of the voltage rating of the switching device.

15. The snubber circuit as claimed in claim 3, wherein the inductance of the second inductor ($L_{s2}$) is $$L_{s2} = C_s\left(\frac{V_{out}}{\hat{i}_{L_{s1}}}\right)^2,$$

where $V_{out}$ is the output voltage and $\hat{i}_{L_{s1}}$ is the current of the first inductor $L_{s1}$.

16. The snubber circuit as claimed in claim 3, wherein the first direction is from the first interfacing point to the second interfacing point through the third interfacing point.

17. The snubber circuit as claimed in claim 3, wherein the first direction is from the second interfacing point to the second interfacing point through the third interfacing point.

18. A power converter comprising the active snubber circuit as claimed in claim 1.

19. The power converter as claimed in claim 18, wherein the power converter comprises:
a main diode device connected between a first node and a second node,
a main switching device connected between the first node and a third node,
wherein the first interfacing point is connected to the first node, the second interfacing point is connected to the second node, and the third interfacing point is connected to the third node.

20. The power converter as claimed in claim 18, wherein the power converter comprises:
main diodes connected between a plurality of first nodes and a second node,
main switching devices connected between the first nodes and a third node,
wherein:
the snubber circuit comprises interfacing points, each first interfacing point being connected to one of the first nodes,
the second interfacing point is connected to the second node, and
the third interfacing point is connected to the third node.

* * * * *